March 11, 1941.　　　O. A. KEHLE　　　2,234,647
FLUID MOTOR
Filed June 20, 1939　　　3 Sheets-Sheet 1
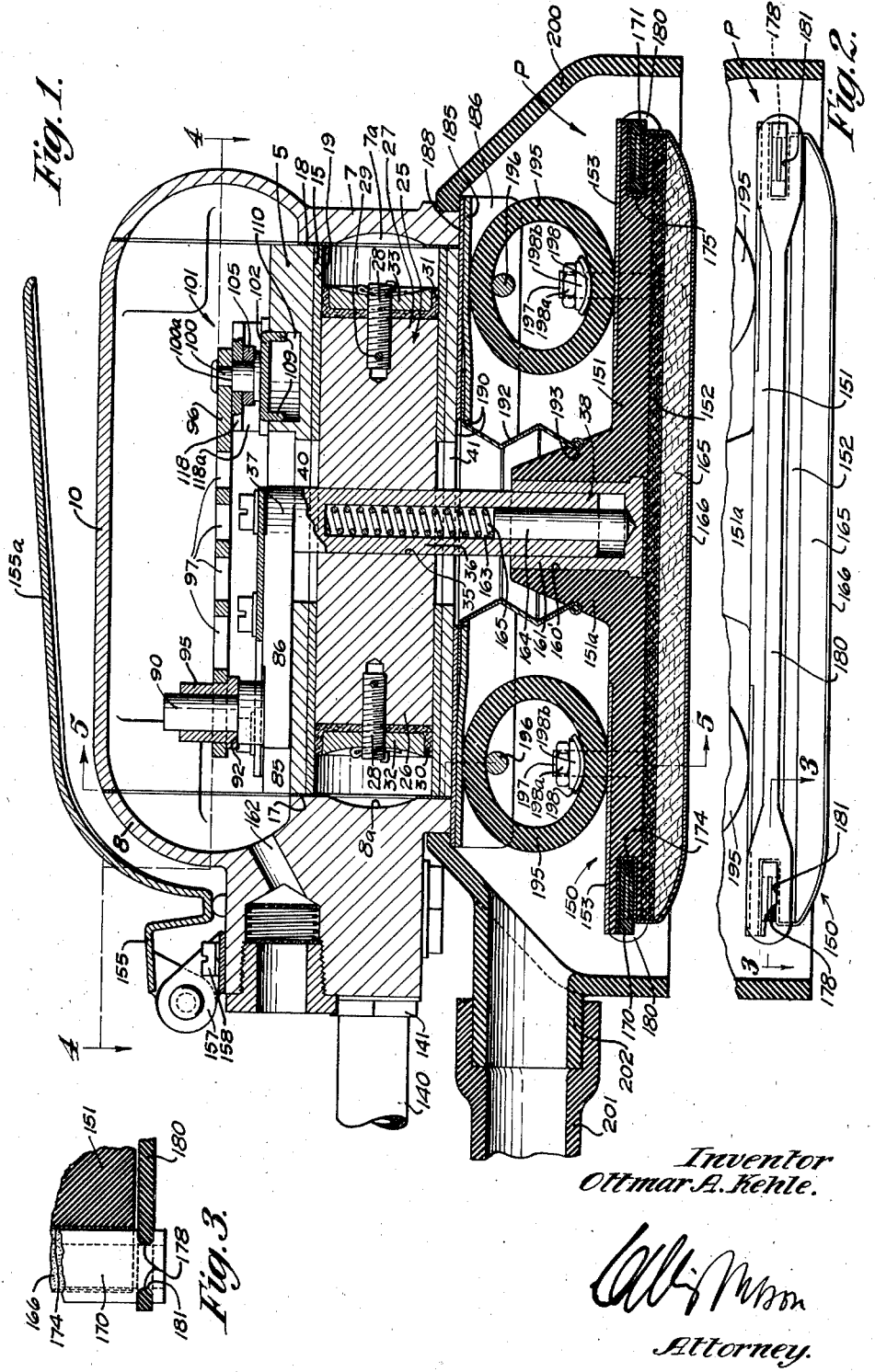
Inventor
Ottmar A. Kehle.
Attorney.

March 11, 1941.  O. A. KEHLE  2,234,647
FLUID MOTOR
Filed June 20, 1939  3 Sheets-Sheet 2

Inventor
Ottmar A. Kehle.
Attorney.

March 11, 1941. O. A. KEHLE 2,234,647
FLUID MOTOR
Filed June 20, 1939 3 Sheets-Sheet 3
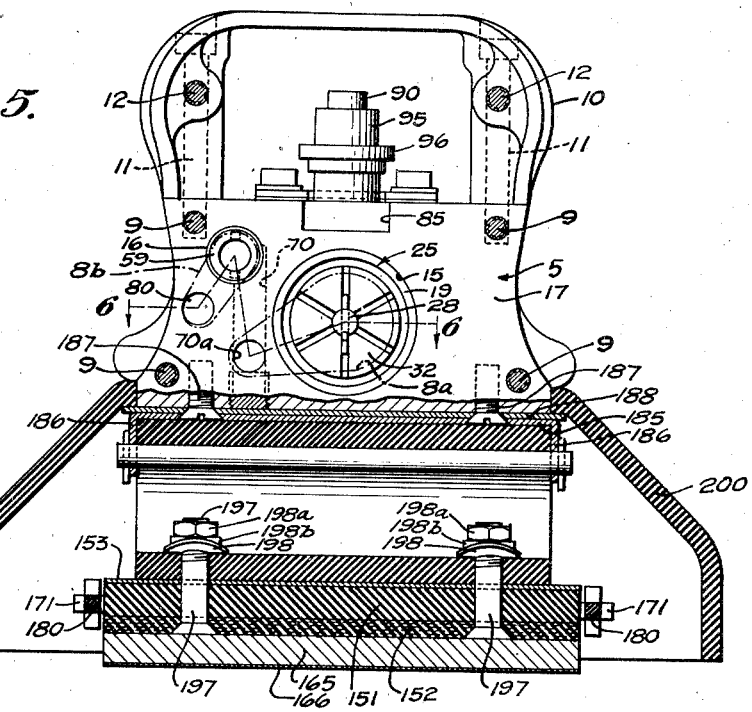
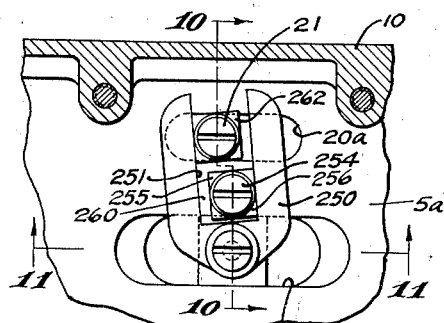
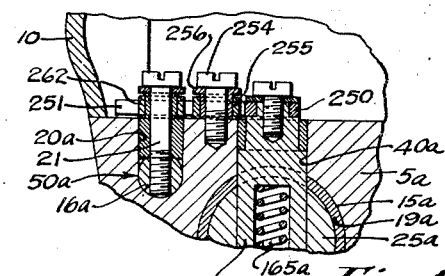
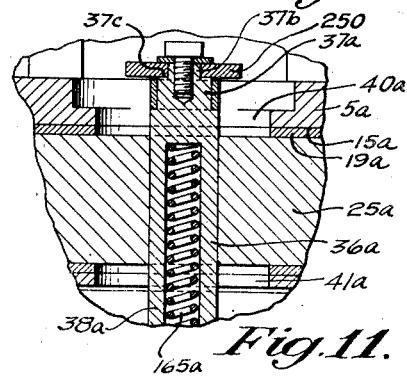
Inventor
Ottmar A. Kehle.
Attorney.

Patented Mar. 11, 1941

2,234,647

UNITED STATES PATENT OFFICE 2,234,647

FLUID MOTOR

Ottmar A. Kehle, West Los Angeles, Calif., assignor to Sterling Tool Products Company Application June 20, 1939, Serial No. 280,118

11 Claims. (Cl. 121—3)

My invention has to do with fluid motor devices and is particularly adaptable for use in reciprocating tools and such devices as sanding and buffing elements, and while it is of course suitable for other purposes, I shall describe it in the latter association.

One of the principal objects of my invention is the provision in such a motor of an extremely simple means of inlet and outlet valve control without the necessity of resorting to rotary motion for such purpose as is the case in conventional devices of this character.

Another object is the provision of a fluid motor in which the fluid inlet and outlet from the cylinder are so controlled as to provide cushioning of the extremes of piston movement to prevent pounding and other objectionable action of the operating parts.

Another object is the provision of a fluid motor having means for providing a relatively longer filling period and for providing relatively rapid valve opening and closing to prevent throttling losses.

Another object is the provision of a motor in which a wide variety of timing can be obtained by extremely simple adjustments.

Another object is the elimination of considerable of the weight which has heretofore been considered necessary in such devices.

Another object is the provision of a fluid motor comprising a minimum of parts and which may be economically manufactured.

Still further objects and attainments are inherent in my invention and those will become obvious to those skilled in the art by reference to the following description of one presently preferred adaption thereof, for which purpose I shall make reference to the accompanying drawings, in which:

Fig. 1 is a vertical sectional view of my motor in conjunction with the sanding and buffing element;

Fig. 2 is a view showing, in elevation, a part of the sanding and buffing element of Fig. 1, part of the surrounding skirt being shown in vertical section;

Fig. 3 is a fragmentary section on line 3—3 of Fig. 2;

Fig. 5 is a section on line 5—5 of Fig. 1;

Fig. 9 is a fragmentary plan view of a variational form of my invention;

Fig. 10 is a section on line 10—10 of Fig. 9; and

Fig. 11 is a section on line 11—11 of Fig. 9.

Figure 4:
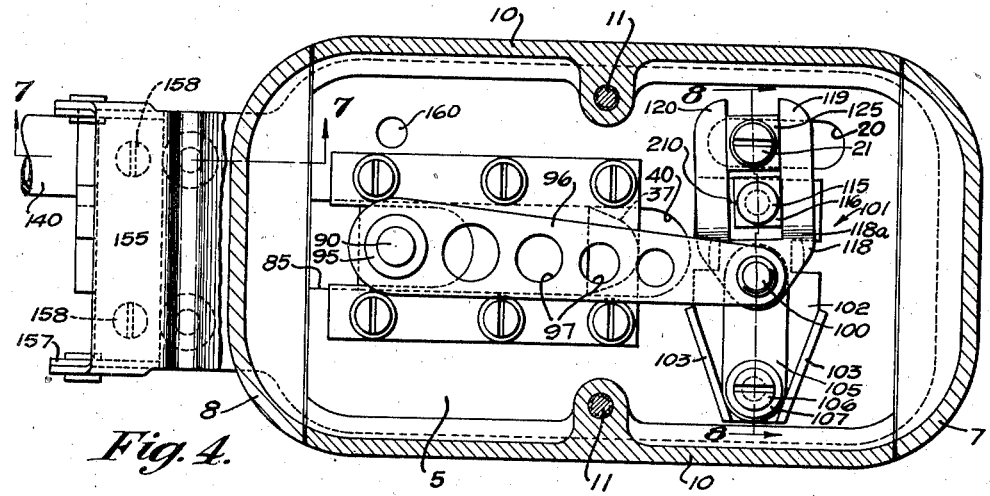
Fig. 4 is a section on line 4—4 of Fig. 1.

As shown in the drawings, my motor employs a body 5 to which end plates 7 and 8 are secured by screws 9, an arched cover plate 10 being secured to the body by screws 11 and to the end plates by screws 12.

A cylinder bore 15 (see Figs. 1, 5 and 6) and a parallel valve bore 16 are provided longitudinally in the body and extend from the front end face 17 to the rear end face 18 of the body, the ends of said bores 15, 16 being closed by end plates 7, 8, respectively. An elongated opening 20 extends upwardly from valve bore 16 and communicates with the top of the body to provide a combined fluid passage and space in which the valve operating pin 21 (see Figs. 4 and 8) may operate.

Within cylinder bore 15 there is a liner 19 and a piston 25 having ends 26, 27 to which are secured, by screws 28, cup washers 30, 31, respectively, and filler washers 32, 33, respectively. A pin 29 passes transversely through piston 25 and through each screw 28 to secure said screws in position.

In a central transverse opening 35 through piston 25 there is fitted a pin 36, the upper end thereof forming a projection 37 for the purpose to be described, and its lower end 38 projecting downwardly through opening 35 to provide a power transmitting means for operation of the tool which I here show as a buffing device P. Body 5 is provided with a top elongated opening or channel 40 to permit projection 37 to oscillate by virtue of longitudinal movement of the piston and a bottom elongated opening 41 to permit like movement of the power transmitting projection 38.

Within bore 16 there is a valve member 50 consisting of a stem 51 having portions 52, 53 of relatively larger diameter to fit the bore 16. Adjacent each of its ends, stem 51 has a portion of reduced diameter to provide fluid space therearound, said portions being designated by the numerals 54, 55, respectively, the extreme end portions 57, 58 being of relatively larger diameter, said portions 57, 58 fitting and being slidable in bushings 59, 60, which line the respective ends of bore 16. Bushing 59 has an annular port 62 communicating with the front end of cylinder bore 15 via fluid passageways 70 and 70a formed in body 5 and recess 8a formed in the inner wall of end plate 8, and bushing 60 has an annular port 63 communicating with the rear end of cylinder bore 15 via fluid passageways 71, 71a formed in body 5 and recess 7a formed in the inner wall of end plate 7. Valve operating pin 21 is threadedly secured transversely in stem 51 adjacent the rear end of said stem. A fluid delivery passage 80 is formed in body 5 parallel to valve bore 16. Said passageway extends lengthwise of the body, being closed at its ends by end plates 7 and 8, and communicates with the front end of the valve bore 16 via recess 8b formed in the inner wall of end plate 8 and communicating with the rear end of the valve bore 16 via recess 7b formed in the inner face of end plate 7. The course of the fluid through said passageways will be later described.

Referring now more particularly to the valve operating structure, the top of body 5 is provided with a channel 85 in which is slidably mounted slide bar 86, which is operably secured at one of its ends to pin 37 and which carries post 90 extending upwardly from its opposite end, said post having a base portion of increased diameter to present a bearing shoulder 92. Post 90 carries a flanged bushing 95, over which one end of a connecting rod 96 is rotatably mounted. For purposes of weight reduction, connecting rod 96 is preferably provided with a plurality of openings 97. The opposite end of connecting rod 96 is pivotally secured, by headed pin 100, to the valve operating unit generally designated by the numeral 101 and now to be described, said pin 100 presenting an annular shoulder 100a against which connecting rod 96 rests.

Figures 7, 8:
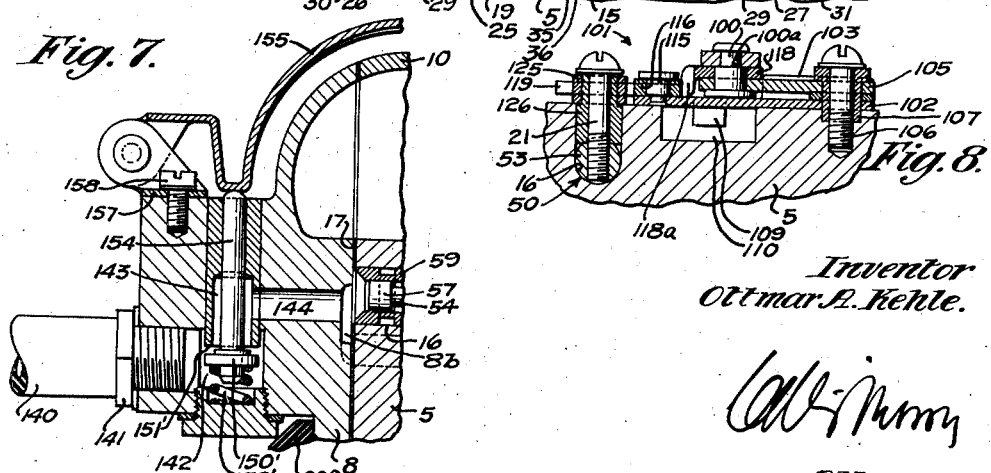
Fig. 7 is a fragmentary section taken on line 7—7 of Fig. 4.
Fig. 8 is a fragmentary section taken on line 8—8 of Fig. 4.

Referring particularly to Figs. 1, 4 and 8, a plate 102 is mounted against the top surface of body 5, said plate presenting upwardly projecting side flanges 103, which flanged sides diverge from the rear end of the plate towards the opposite end. Rockably mounted on plate 102 there is a link 105 which is pivotally secured to plate 102 and body 5 by means of screw 106 and bushing 107, said screw also serving to secure the rear end of plate 102 to the body. The forward end of plate 102 is held against rocking movement by means of depending ears 109 which project into recess 110 in the body 5.

Rotatably mounted on headed pin 115, which pin fits into a hole provided in and adjacent the forward end of plate 102, there is a fulcrum nut 116 which provides a fulcrum for a yoke 118 whose branches 119 and 120 straddle the nut 116. Yoke 118 is pivotally secured at its inner end to one end of link 105 by means of pin 100 and is downwardly curved in longitudinal section at 118a (Fig. 4) so that its outer end portion is coplanar with link 105. The outer end of branches 119 and 120 of yoke 118 confine therebetween a nut 125, which nut is rotatably mounted on bushing 126, said bushing surrounding valve operating pin 21 before described.

Fluid under pressure enters through hose 140 (Fig. 7) which is secured to end plate 8 by any suitable means such as by connecting member 141. The fluid enters end plate 8 via the passageway formed by ports 142, 143 and 144, port 143 being controlled by valve 150' which is normally urged against its seat 151' by coil spring 152' and being movable downwardly off its seat to open the passageway by stem 154, which is adapted to be manually pressed downwardly by lever 155. Lever 155 is mounted on end plate 8 by means of bracket 157 secured thereto by screw 158. Arm portion 155a of the lever is preferably sufficiently flexible that when the motor is in operation, portion 155a may be held down against the top of the cover plate, inasmuch as normally some manual pressure is exerted on the motor device to hold its carried tool against the work. Thus when the manual pressure on the motor device is released, valve 150' is automatically urged against its seat 151' to stop the flow of fluid to the motor. Fluid entering through port 144 enters passageway 80 from which it is alternately communicated to the front end of the motor via the passageway formed by recess 8b, valve controlled port 62 and ports 70, 70a and 8a and to the rear end of the motor via the passageway formed by recess 7b, valve controlled port 63 and ports 71, 71a and 7a. When valve member 57 reaches exhaust port opening position (the exhaust port being shown in partially open position in Fig. 6), the fluid which passes from cylinder 15 via passageways 8a, 70a, 70 and port 62 enters bore 16 around stem 54 and passes upwardly through port 160 into the upper structure of the motor housed by top cover plate 10 and thence out through port 162 (Fig. 1) in the front cover plate 8. When valve 58 is in exhaust port opening position (which takes place fully when it reaches the right extremity of movement in Fig. 6), the fluid from the rear end of cylinder 15 is exhausted through the passageway formed by ports 7a, 71a, 71 and port 63, thence around stem 55 in bore 16 and thence upwardly through body opening 20 into the upper structure of the motor housed by cover 10 and finally passes out through port 162.

In Figs. 1 and 5, I show my motor mounted on and operably connected to a sanding and buffing device P which is comprised of a pad element 150 consisting of a relatively thick flexible rubber pad 151 having a bottom facing sheet 152 and a top facing sheet 153. Sheets 152 and 153, while flexible, are preferably relatively stiffer and more durable than pad 151 and I have found that leather is a desirable material for said sheets. The central portion 151a of pad 151 is relatively thicker than the remainder of said pad and is provided with a socket 160' lined with a metal bushing 161 into which the lower end of pin extension 36 extends to a point spaced from the bottom. Pin 36 has a longitudinal bore 163, in which bore a plunger 164 is slidably mounted, said plunger being urged against the bottom of bushing 161 by coil spring 165, which spring seats at its bottom against the top end of pin 164 and at its top end against the upper end of the bore. The lower end of pin 164 and the medial bottom bearing portion of bushing 161 are V-shaped in cross section for the purpose of maintaining the pin 164 centered therein. Facing sheet 152 is covered at its bottom by felt member 165 and a work sheet 166 is stretched longitudinally over the felt and the ends of facing sheet 152 and pad 151, said work sheet being held in position on the device by a pair of cross bars 170, 171 (Figs. 1, 2 and 3), which confine the ends of the work sheet within end sockets 174 and 175 provided transversely of the ends of the pad 151. Cross bars 170, 171 project at their ends beyond the sides of the pad (see Fig. 3) and, adjacent their ends, are provided with annular channels 178, into which channels are fitted the elastic strips 180, each of which strips is provided with a hole 181 at each end to fit over the projecting end of the cross bar, there being one of said strips 180 at each side of the pad. The pad unit P is secured to the bottom of the motor body by means of a plate 185 which has a depending flange 186 at each side. Plate 185 is secured to the motor body by means of screws 187 which pass through plate 185, a companion plate 188 and into the body 5. Plates 185 and 188 are provided with a central opening 190, which opening is sufficiently large to permit pin 36 to oscillate by virtue of movement of the motor piston.

Socket 160' and its associated elements are protected from entry of dust and foreign matter by means of a skirt 192 which is secured at its lower end to pad portion 151a by a ring which fits into annular channel 193 and is secured at its top end by being confined between plates 185, 188 around opening 190.

A pair of transversely extending tubular flexible members 195—for instance, each of these members may be comprised of a length of rubber hose—spaces pad element 150 from plate 188, said tubular members being held at their top against plate 188 by means of cross pins 196, which pins project at their respective ends through holes in flanges 186 and extend longitudinally in the tubular members 195. Bolts 197, which extend through pad element 150 and through the lower wall of the tube 195, secure the pad element 150 to the tubes 195 by means of the concaved cross strips 198, the nuts 198a and the lock washers 198b.

In operation, the work face of such sanding and buffing devices usually creates considerable dust and the like and to correct that shortcoming I provide a skirt 200 surrounding the working parts of the sanding and buffing element, said skirt preferably being of soft rubber and being secured to the motor device by its top edge fitting over the periphery of plate 185. To withdraw such dust or the like, a hose 201, which communicates with the interior of the skirt through a connecting member 202, leads to a suitable suction creating member (not shown).

The operation of my motor is as follows. When the fluid flow control lever 155a is manually pressed down, valve 150' is moved off its seat to allow fluid under pressure to enter from line 140 through passageways 142, 143, 144, 8b into chamber 80, from which it is alternately fed to the respective ends of cylinder 15.

Figure 6:
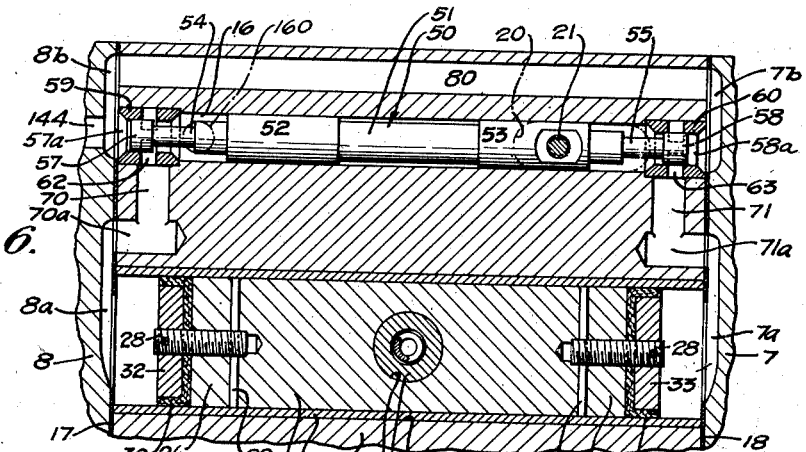
Fig. 6 is a developed sectional view taken on line 6—6 of Fig. 5.

In Fig. 6, the piston 25 is shown substantially in center position and moving to the left. The fluid flow to the right hand end of cylinder 15, from chamber 80 through passageway 7b, end 58a of the valve cylinder 16, port 63 and passageways 71, 71a and 7a, has now been closed off by virtue of end 58 of the valve stem moving to the right to cover port 63. Movement of the piston 25 to the left is continued by virtue of expansion of the fluid behind the right hand end of the piston. Fluid is being exhausted from the left hand end of the cylinder 15 through passageway 8a, 70a, 70, 62, around the reduced valve stem portion 54 and port 160. Upon further movement of piston 25 to the left, valve member 57 will be moved to exhaust port closing position and, before the piston reaches the extreme left end position, the intake through end 57a of valve cylinder 16 and port 62 will be opened to allow entry of fluid to cushion the end of the stroke and valve member 58 will have reached its exhausting position. Then as piston 25 begins its right hand movement, valve member 57 remains in its fully open position until the clearance provided by space 210 between fulcrum nut 116 and yoke arm 120 is taken up.

By virtue of my improved valve actuating means, a wide variety of timing can be obtained by the simple expedient of varying the relative length of the link 105 and yoke 118, or by varying the clearance 210 by substituting a narrower or wider fulcrum member 116 or by varying the distance between the yoke arms 119 and 120.

By providing the clearance 210 at the fulcrum point, the valve will stay in its end position until that clearance is taken up before movement of the valve stem in the opposite direction is commenced. The degree of filling cylinder 15 therefore can be predetermined by the amount of lag or clearance introduced at the fulcrum—usually it is desirable to continue this filling operation during from forty to fifty percent of the piston travel. Since the piston travels a relatively considerable distance before the valve is moved from its extreme end position, the movement of the valve during the remainder of the piston travel is quite rapid, providing a snap action for closing and opening the valve ports, which is a highly desirable result in that it reduces throttling losses to the minimum.

In Figs. 9, 10 and 11, I show a variational form of my invention, the variations having particularly to do with the valve actuating means.

In those figures, I show a body 5a having a longitudinal cylinder bore 15a in which is slidably mounted piston 25a. The body has an upper rectangular channel 40a and a lower similarly shaped channel 41a, which channels extend from the cylinder interior to the exterior of the body. A pin 36a extends transversely through the central portion of the piston and has end 37a projecting above channel 40a, which end terminates in reduced portion 37b providing a shoulder 37c. Lower end 38a of the pin projects through channel 41a to provide a power-transmitting means at the bottom of the body, the lower end portion 38a of the pin being hollow to house a coil spring 165a, which spring is the same as spring 165 before described.

Rotatably mounted on pin portion 37b, I provide a yoke 250 which has a longitudinal slot 251 through the outer end of which valve operating pin 21 projects. Pin 21 moves along the channel 20a which extends from the valve bore through the top of the channel as before described. A pin 254 is screwthreadedly mounted at its bottom end in body 5a and carries a sleeve 255 and bushing 256, which pin, sleeve and bushing project through slot 251, between the valve operating pin 21 and the point of connection of the yoke with bushing 37b, thus forming a fulcrum for the yoke member. The remaining parts of the motor of Figs. 9 and 10 are the same as described in connection with the other figures.

In operation, yoke 250 acts as a lever and as the piston travels longitudinally of the cylinder, the inner side surfaces of the yoke alternately engage the fulcrum sleeve 255 to cause the outer end of the yoke to engage valve operating pin 21 to slide the valve stem within the valve bore in the manner before described. A clearance 260 is provided by making sleeve 255 of a diameter less than the width of slot 251, and a clearance is also provided between sleeve 262 and the opposite arms of yoke 250, all so as to provide a lag at the respective ends of the piston stroke for the purposes before described.

While, in the foregoing description, I have resorted to various details of structure and association of parts, I wish it understood that I do not thereby confine my invention to such specific details. Rather, various modifications and adaptations may be made within the broader scope of the invention as defined by the appended claims.

I claim:

1. A fluid motor comprising a body having a cylinder bore, a piston slidably mounted in the cylinder bore, fluid passageways in the body establishing communication between the cylinder and the body exterior, valve means in the body for controlling said passageways to alternately admit fluid to and pass fluid from the respective ends of the cylinder bore via said passageways, a valve operating member connected to the valve means, means operably connected with the piston and with the valve operating member for actuating the valve means by virtue of sliding movement of the piston, including a yoke pivotally connected at its inner end to the body, said yoke having two horizontally spaced parallel legs extending from its inner end, said respective legs passing on the respective sides of the valve operating member for alternate engagement therewith, fulcrum means carried by the body and extending between and being engageable by the legs of the yoke, and a connecting rod operatively connected at one end to the piston and at its other end to the inner end of the yoke.

2. The device of claim 1 in which the fulcrum member is of a width less than the distance between the legs of the yoke.

3. A fluid motor comprising a body having a cylinder bore, a piston slidably mounted in the cylinder bore, fluid passageways in the body establishing communication between the cylinder and the body exterior, valve means in the body for controlling said passageways to alternately admit fluid to and pass fluid from the respective ends of the cylinder bore via said passageways, a valve operating member connected to the valve means, means operably connected with the piston and with the valve operating member for actuating the valve means by virtue of sliding movement of the piston, including a link pivotally connected at its inner end to the body, a yoke pivotally connected at its inner end to the outer end of the link and having two spaced parallel legs extending outwardly from a point spaced from its inner end, said valve operating member being positioned between and engageable by the legs of the yoke, a fulcrum member rotatably carried by the body and being positioned between the yoke legs at a point spaced from their ends so as to be alternately engageable by said legs, and a connecting rod operatively connected at one end to the piston and at its other end to the inner end of the yoke.

4. The device of claim 3 in which the fulcrum member is comprised of a sleeve rotatably mounted on a pin carried by the body and in which said sleeve is of a width less than the distance between the legs of the yoke.

5. A fluid motor comprising a body having a cylinder bore, a piston slidably mounted in the cylinder bore, fluid passageways in the body establishing communication between the cylinder and the body exterior, valve means in the body for controlling said passageways to alternately admit fluid to and pass fluid from the respective ends of the cylinder bore via said passageways, a valve operating member connected to the valve means, means operably connected with the piston and with the valve operating member for actuating the valve means by virtue of sliding movement of the piston, including a plate secured to the body, a link pivotally secured at its inner end to the plate, a yoke pivotally connected at its inner end to the outer end of the link and having two horizontally spaced parallel legs extending outwardly from a point spaced from its inner end, said valve operating member being positioned between and engageable by the legs of the yoke, a pin secured to the plate and positioned between said legs at a point spaced from their ends, a sleeve rotatably mounted on the pin for alternate engagement by the respective legs of the yoke whereby said sleeve acts as a fulcrum for the yoke, and a connecting rod operatively connected at one end to the piston and at its other end to the inner end of the yoke.

6. A device of the class described comprising a body having a cylinder bore, a piston slidably mounted in the bore, an end plate secured to the body, a cover plate on the body, a fluid inlet port through the end plate, valve means controlling said inlet port, a valve operating handle secured to the end plate and extending over and substantially parallel to the cover plate, said handle being operatively connected to said valve, fluid passageways in the body establishing communication between said inlet port and said cylinder bore, valve means controlling said passageways and an operative connection between said piston and said last mentioned valve means whereby said valve is actuated by virtue of the movement of the piston.

7. A device of the class described comprising a body having an end cover plate and a top cover plate, a cylinder bore in the body, a piston slidably mounted in the cylinder bore, a fluid inlet port through the end plate, valve means controlling said inlet port, a valve stem connected at its lower end to the valve and projecting at its upper end through the top of the end plate, a spring normally urging the valve into closed position, a valve stem operating lever pivotally mounted at one end on the end plate and extending over the top cover plate, said lever bearing against said projecting end of the valve stem whereby when the lever is pressed down the valve stem will act so as to move the valve into open position, a fluid passageway in the body establishing communication between said inlet port and said cylinder bore, valve means controlling said passageway, and an operative connection between said piston and said last mentioned valve means whereby said valve is actuated by virtue of movement of the piston.

8. A device of the class described comprising a body having end plates and a longitudinal cylinder bore, said end plates forming closures for the ends of the cylinder, a piston mounted in the cylinder, said piston being shorter than the cylinder bore so as to be slidable therein, a valve bore in the body, a valve stem slidably mounted in the valve bore, a valve head at each end of the valve stem, a fluid chamber within the body, fluid passageways in the body, one of said passageways leading from one end of the fluid chamber through the valve bore to one end of the cylinder bore and another of said passageways leading from the other end of the fluid chamber through the valve bore to the other end of the cylinder bore, a vertically disposed channel in the body extending from the valve bore to the top of the body, a valve stem operating pin secured at its lower end to the valve stem and projecting at its top end through the body, said pin extending longitudinally of said channel, means operably connected with the piston and with the valve stem operating pin for actuating the valve means by virtue of sliding movement of the piston, including a lever mounted on the body and engaging the valve stem operating pin at one end, a connecting rod operatively connected at one end to the piston and at its other end to the other end of the lever, and a fulcrum member on the body between the ends of the lever and being engageable by the lever.

9. The device of claim 8 which includes a fluid supply port communicating with the fluid chamber, a valve controlling said port and means for manually actuating said valve, including a valve stem connected at one end to the valve and projecting at its other end through the top of an end plate, and a lever mounted at one end on said end plate and extending at its other end over the top of the body, said lever engaging said projecting end of the valve stem as a fulcrum.

10. A fluid motor comprising a body having a cylinder bore, a piston slidably mounted in the cylinder bore, fluid passageways in the body establishing communication between the cylinder and the body exterior, valve means in the body for controlling said passageways to alternately admit fluid to and pass fluid from the respective ends of the cylinder bore via said passageways, a valve operating member connected to the valve means, means operably connected with the piston and with the valve operating member for actuating the valve means by virtue of sliding movement of the piston, including a link pivotally connected at its inner end to the body, a lever whose inner end is mounted on and pivotally connected to the other end of the link, the outer end of said lever being bifurcated and being downwardly and outwardly curved adjacent its point of connection with the link, and a fulcrum member carried by the body and projecting between said bifurcations at a point spaced from their ends, said bifurcations passing on the respective sides of the valve operating member in position to move said member when moved about said fulcrum.

11. A fluid motor comprising a body having a cylinder bore, a piston slidably mounted in the cylinder bore, fluid passageways in the body establishing communication between the cylinder and the body exterior, valve means in the body for controlling said passageways to alternately admit fluid to and pass fluid from the respective ends of the cylinder bore via said passageways, a valve operating member connected to the valve means, means operably connected with the piston and with the valve operating member for actuating the valve means by virtue of sliding movement of the piston, including said piston having a cup washer secured to each of its ends by means of a screw threadedly mounted longitudinally in the piston and a pair of pins extending transversely through the piston, each of said pins intersecting one of said screws to hold it against rotation with respect to the piston.

OTTMAR A. KEHLE.